United States Patent [19]
Newman et al.

[11] Patent Number: 6,085,229
[45] Date of Patent: Jul. 4, 2000

[54] SYSTEM AND METHOD FOR PROVIDING CLIENT SIDE PERSONALIZATION OF CONTENT OF WEB PAGES AND THE LIKE

[75] Inventors: Gary H. Newman, Concord, Mass.; Christopher J. Enscoe, Earlville, N.Y.

[73] Assignee: Belarc, Inc., Maynard, Mass.

[21] Appl. No.: 09/079,120

[22] Filed: May 14, 1998

[51] Int. Cl.[7] .................................................. G06F 13/00
[52] U.S. Cl. ........................................................ 709/203
[58] Field of Search ..................................... 709/200, 203, 709/219; 705/14; 706/12; 707/10

[56] References Cited

U.S. PATENT DOCUMENTS

5,740,549  4/1998  Reilly et al. ................................ 705/14
5,918,014  6/1999  Robinson .................................. 709/219

*Primary Examiner*—Robert B. Harrell
*Attorney, Agent, or Firm*—Richard A. Jordan

[57] ABSTRACT

A network includes one or more client computers which can retrieve Web pages and supplemental content items, such as advertisements, from one or more server computers, for display or other processing. Each Web page can have fixed content, one or more fixed URL's identifying supplemental content items to be, for example, displayed at particular locations on the Web page, and one or more sets of conditional items, with each conditional item set comprising content item(s) or content item identifier(s), such as URL's, and personal selection criteria to be used in selecting one of the content item(s) or identifier(s) to be, for example, displayed at a respective location on the Web page. When a client computer receives a Web page from a server computer, it (that is, the client computer) will, for example, display the fixed Web page content and, obtain supplemental content items identified by the fixed URL's to be displayed along with the fixed content. In addition, the client computer will process each set of conditional items in conjunction with personal information maintained by the client computer and selection criteria for the set to identify one of the conditional content item(s) to be displayed, or one of the conditional item identifier(s) to be used in obtaining a supplemental content item to be displayed along with the Web page. Since the client computer determines the particular conditional content or content identifier based on selection criteria provided with the Web page, and personal information maintained by the client computer itself, the personal information need not be provided to or otherwise obtained by the server computer to allow for personalization of the Web page.

80 Claims, 4 Drawing Sheets

SYSTEM AND METHOD FOR PROVIDING CLIENT SIDE PERSONALIZATION OF CONTENT OF WEB PAGES AND THE LIKE

FIELD OF THE INVENTION

The invention relates generally to computer networks and the like, and more particularly to systems and methods for providing client-side personalization of information, such as provided in World Wide Web "Web pages" and the like, which are transferred by a server computer to a respective client computer in the network.

BACKGROUND OF THE INVENTION

Networks, such as the Internet and World Wide Web (collectively, "Internet"), provide mechanisms that allows computers to share information. Typically, computers which share information over the Internet operate according to a "client-server" paradigm. In the client-server paradigm, some computers, operating as servers, make information, such as Web pages, available for retrieval by other computers, which operate as clients. When a client is to retrieve a particular Web page from a server, it transmits a request over the communication links to the particular server, or one of a plurality of particular servers, which maintain the Web page that is to be retrieved. The server which receives the request will, in turn, transfer the requested Web page to the client computer. When the client computer receives the Web page, it can display it (that is, the Web page) to the operator or otherwise utilize the information received from the server computer. Typically, a client computer will make use of a network "browser" program, such as the Netscape Navigator or Microsoft Internet Explorer program, to enable an operator to identify the particular Web page that is to be requested, and to display or otherwise utilize the Web page when it is received.

A number of types of information are available for retrieval over the Internet. For example, some newspapers, magazines and broadcast news outlets also operate as "web sites," operating server computers which provide at least some of the information which is available in their respective, for example, hardcopy publications, in the case of newspapers and magazines, and broadcasts, in the case of broadcast news outlets. In addition, some news outlets and "e-zines," or "electronic magazines," which only have presence on the Internet, have developed to distribute news and other information over the Internet. In these cases, typically the publishers sell advertising space on their Web pages and insert advertising therein. Furthermore, mail order merchandisers have developed web sites that allow potential customers to access information concerning their offerings and to order goods and services offered thereby.

One of the problems with advertising over the Internet is that it is generally difficult to target particular types of advertising and other Web page content to particular clients, based on the particular needs and interests of the clients and their operators. Generally, in the non-Internet context, such as advertising sent through the U.S. mails, pieces of advertising, such as catalogs, are mailed to potential customers' addresses based on their (that is, the potential customers') prior buying habits, as can be determined from previous purchases from the same or similar advertisers, credit card transaction information, the town in which they live and information as to advertisements to which the potential customer has responded to in the past. This information is generally difficult to obtain and apply in the case of advertising over the Internet. Typically, targeting of advertising over the Internet is performed by means of advertising management systems, which use types of such personal information as can be determined from protocols used for communications over the Internet, such as the type of browser, the client's Internet domain, the particular Web site(s) the client has recently accessed, and the like. Such information is generally very broad and does not provide a high degree of accuracy or reliability for targeting, and as a result such advertising management systems are not widely used.

In addition, "server-side" content targeting systems have been developed which can customize Web page content for particular clients and their operators. These systems require a significant amount of personal information about the respective operators to be sent to the server to be useful. Generally, such systems ask the operators to provide at least some of the personal information, through filling out questionnaires or the like or making use of information that they (that is, the systems) may have about an operator who identifies him- or herself when accessing a particular Web page. Content targeting systems are rarely used because operators rarely wish to provide such personal information to a server database or their personal identifications to the server would be required to link to the personal operator information which they may have. Recently, an "Open Profiling Standard" ("OPS") has been proposed to standardize the way in which a server can obtain personal information for a particular operator from the operator. Under the OPS, the personal information obtained from the operator is stored as a "profile" on the operator's client computer, rather than on an advertisers' server computers. Some or all of the OPS profile could be retrieved by an advertiser and sent to the server, as part of the communications over the Internet, for purposes of targeting of advertising and the like. Since the OPS profile would be used for multiple Web sites, the OPS would reduce or eliminate the need for the operator to re-enter personal information for each Web site. However, that may not be sufficient inducement for the operator to provide the information for the profile either accurately or at all, particularly if he or she is concerned about the privacy of the information in the profile. In addition, an operator could provide and store multiple OPS profiles on his or her client computer, and could easily use a false identity to retain anonymity over the Internet. Thus, the quality of the personal information that could be obtained by use of the OPS is suspect.

SUMMARY OF THE INVENTION

The invention provides a new and improved system and method for providing personalization of information, such as provided in World Wide Web "Web pages" and the like, which are transferred by a server computer to a client computer in a network.

In brief summary, the invention provides a network including one or more client computers which can retrieve Web pages and supplemental content items, such as advertisements, from one or more server computers, for display or other processing. Each Web page can have fixed content, one or more fixed URL's identifying supplemental content items to be, for example, displayed at particular locations on the Web page, and one or more sets of conditional items, with each conditional item set comprising content item(s) or content item identifier(s), such as URL's to text, images, applets and the like, along with personal selection criteria to be used in selecting one of the content item(s) or identifier(s) to be, for example, displayed at a respective location on the Web page. When a client computer receives a Web page from a server computer, it (that is, the client computer) will, for example, display the fixed Web page content and, obtain supplemental content items identified by the fixed URL's to be displayed along with the fixed content. In addition, the client computer will process each set of conditional items in conjunction with personal information maintained by the client computer and selection criteria for the set to identify one of the conditional content item(s) to be displayed, or one of the conditional item identifier(s) to be used in obtaining a supplemental content item to be displayed along with the Web page. Since the client computer determines the particular conditional content or content identifier based on selection criteria provided with the Web page, and personal information maintained by the client computer itself, the personal information need not be provided to or otherwise obtained by the server computer to allow for personalization of the Web page.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
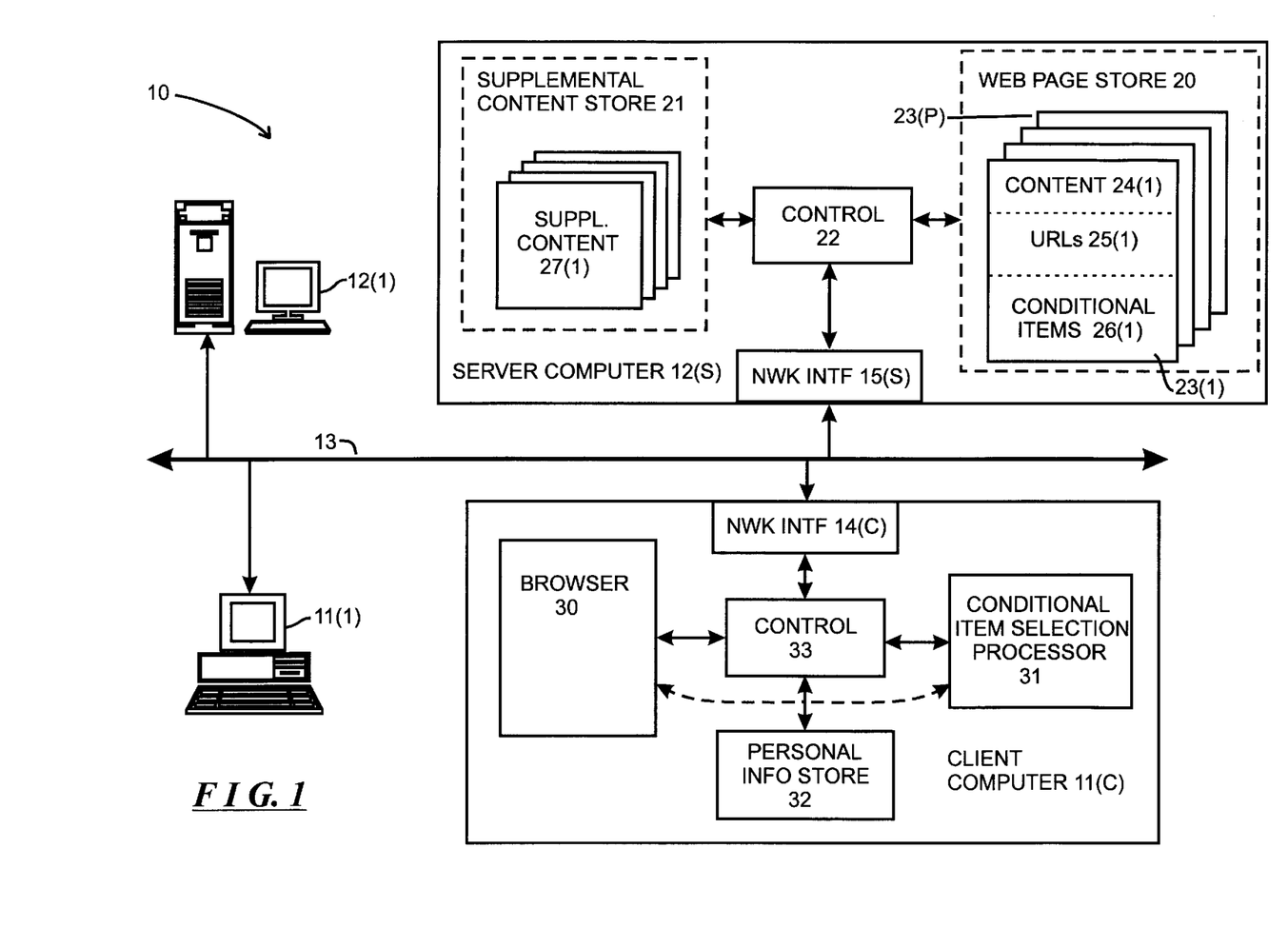
FIG. 1 is a functional block diagram of computer network including an arrangement for providing client-side personalization, customization and targeting of the content of Web pages that are downloadable over networks such as the Internet and World Wide Web, constructed in accordance with the invention.

FIG. 1 is a functional block diagram of a computer network 10 including an arrangement for providing client-side personalization of the content of Web pages that are downloadable over networks such as the Internet and World Wide Web, constructed in accordance with the invention. With reference to FIG. 1, computer network 10 includes a plurality of computers 11(1) through 11(C) (generally identified by reference numeral 11(c)) and 12(1) through 12(S) (generally identified by reference numeral 12(s) are interconnected by one or more communication links, generally identified by reference numeral 13. As is conventional, at least some of the computers 11(c) are in the form of personal computers or computer workstations, each of which includes a system unit, a video display unit and operator input devices such as a keyboard and mouse. Each of the computers 12(s) also includes a system unit, and may also include a video display unit and operator input devices. The computers 11(c) and 12(s) are of the conventional stored-program computer architecture. A system unit generally includes processing elements, memory, mass storage devices such as disk and/or tape storage elements, and other elements including network interface devices 14(c), 15(s) for interfacing the respective computer to the communication link 13. A video display unit permits the computer to display processed data and processing status to the user, and an operator input device enable the user to input data and control processing by the computer. The computers 11(c) and 12(s) transfer information, in the form of messages, through their respective network interface devices 14(c), 15(s) among each other over the communication link 13.

In one embodiment, the network 10 is organized in a "client-server" configuration, in which server computers, in particular those identified by reference numerals 12(s), operate as a server, and the other computers 11(c) operate as clients. Typically, the servers include large-capacity mass storage devices which can store information available for retrieval by the client computers over the communication link 13 which may be used in their processing operations. From time to time, a client computer 11(c) may also store data on a server computer 12(s), which may be processed by the server computer 12(s) or later retrieved by the client computer that stored the data or other client computers. The server computers 12(s) may be generally similar to the client computers 11(c), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

The communication links interconnecting the components of the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As noted above, the system 10 provides an arrangement for providing client-side personalization of the content of Web pages that are downloadable over networks such as the Internet and World Wide Web. That is, the system 10 allows for personalization of Web page content under control of the particular client computer 11(c) and/or respective operator thereof, and without requiring personal and potentially private information regarding the client computer 11(c) and/or its operator to be provided to the server computer(s) 12(s) which provide the Web page content. Generally, the system 10 accomplishes this by providing that a Web page transferred by a server computer 12(s) to the client computer 11(c) have, for a particular frame or other portion of the Web page that is to be personalized, instead of the actual content to be displayed or a URL to a specific location on the network from which specific content to be displayed is to be obtained, a set of conditional items, along with selection criteria to be used in selecting one of the content items to be used in providing the content to be used for the frame or other portion. Each conditional item in the set may include an item of content, a URL, a HyperText link, alternate text, or any other item that may be used in providing content for the frame or other portion of the Web page, or which identifies content which may be retrieved over the Internet or World Wide Web. When the client computer 11(c) receives the Web page, including the respective conditional items, it will use "personal information" which it (that is, the client computer 11(c)) maintains concerning itself or the particular operator to select one of the conditional items. If the selected conditional item comprises a content item or alternative text that is provided in the conditional item itself, the client computer 11(c) can display the selected conditional item in the respective frame or other portion of the Web page. On the other hand, if the selected conditional item comprises a URL that identifies a content item that is to be retrieved over the Internet or World Wide Web, the client computer 11(c) can use the selected URL to retrieve the content item over the Internet/World Wide Web and display it in the respective frame or other portion of the Web page. Thus, the personal information which is used in selecting the conditional item is maintained by the client computer 11(c), and is not provided to any of the server computers 12(s) or other third parties, thereby maintaining the privacy of the personal information.

The system 10 will be described in the context of providing advertising content that can be displayed in Web pages that are available over the Internet and World Wide Web, but it will be appreciated that any type of content can be used. In addition, the system will be described as making use of rules, similar to those which are used in expert systems, to provide the specific criteria to be used in selecting one of the content items or URL's to be used by the client computer 11(c) in the display of a respective Web page, but it will be appreciated that other types of constructs may be used to specify the selection criteria. Thus, and with further reference to FIG. 1, a functional block diagram of a server computer, in particular server computer 12(S), and of a client computer, in particular client computer 11C), will be described. Other server computers 12(s) and client computers 11(c) will be generally structured similarly to server computer 12(S) and client computer 11(C) respectively. As shown in FIG. 1, the server computer 12(S), includes the aforementioned network interface device 15(S), and in addition includes a Web page store 20(S), supplemental content store 21(S) and a control module 22(S). The Web page store 20(S) and supplemental content store 21(S) may be provided in, for example, the aforementioned mass storage subsystem (s) maintained by the server computer 12(S), and the control module 22(S) may include, for example, the server computer's processing elements along with suitable programming.

The Web page store 20 stores one or more Web pages 23(1) through 23(P) (generally identified by reference numeral 23(p)) which may be requested for retrieval by a client computer 11(c). Each Web page 23(p) will typically be identified by an identifier, such as a URL (uniform resource locator) that will uniquely identify the Web page and the server computer 12(S) which is to supply the Web page over the network. The client computers 11(c) will typically use the identifier in requesting the Web page from the server computer 12(S). Each Web page 23(p) maintained by the server computer 12(S) will preferably include some Web page content 24(p) which can be used by the client computer 11(c) in displaying the Web page to the respective operator thereof. In addition, each Web page 23(p) may include one or more URL's or other identifiers (generally identified in FIG. 1 as URL's 25(p)) to other information, which is referred to herein as "supplemental content," that is available over the network which will provide content for various portions of the Web page 23(p), such as (but not limited to) advertising information to be displayed in conjunction with the Web page 23(p). Each such URL uniquely identifies the information to be used and the particular server computer, which may be the server computer 12(S) or another server computer 12(1) through 12(S-1), which is to provide the information. When a client computer 11(c) retrieves a Web page 23(p) from the server computer 12(S) which contain such URL's, it can also use the URL's to retrieve the supplemental content for display in the respective portions of the Web page 23(p).

The supplemental content store 21 includes supplemental content items 27(1) through 27(I) (generally identified by reference numeral 27(i)) which may be used to provide supplemental content for the Web pages 23(p) which are available from the server computer 12(S) as well as for Web pages which are available from other server computers 12(1) through 12(S-1). Generally, the supplemental content items 27(i) may comprise any of a number of types of content that may be displayed with Web pages, including but not limited to advertising content. Each supplemental content item 27(i) is typically identified by a URL or other identifier that uniquely identifies it and the server computer 12(s) from which it can be obtained. If a client computer 11(c) obtains a Web page 23(p) from server computer 12(S) that contains a URL 25(p) which identifies a supplemental content item 27(i), it can initiate a retrieval of the supplemental content item 27(i) from the server computer 12(S) for display with the Web page 23(p). Similarly, if a client computer 11(c) obtains a Web page from the server computer 12(S) that contains a URL that identifies a supplemental content item maintained by another server computer 12(s) (s≠S), it can initiate a retrieval of the supplemental content item 27(i) from that other server computer 12(s), and if a client computer 11(c) obtains a Web page from a server computer 12(s) (s≠S) that contains a URL that identifies a supplemental content item maintained by server computer 12(S), it can initiate a retrieval of the supplemental content item 27(i) from that server computer 12(S). The supplemental content item that is to be displayed with a Web page need not be provided by the same server computer that provided the Web page, but instead may be provided by another server computer.

In accordance with the invention, each Web page 23(p) may also include one or more sets of conditional items, generally identified by reference numeral 26(p), and selection criteria that is to be used, along with personal information provided on the client computer 11(c), in selecting one of the items from the respective set that is to provide content for display with the Web page. Each conditional item in each set may comprise, for example, an item of Web page content, a HyperText link, a URL, alternate text, or any other mechanism for identifying content to be displayed on or along with a Web page. When a client computer 11(c) retrieves a Web page 23(p) from the server computer 12(S) which contains conditional content items, it will determine from the selection criteria in the Web page and the personal information which of the conditional content items is to be displayed with the Web page 23(p), and will display that conditional content item therewith. Similarly, when a client computer 11(c) retrieves a Web page 23(p) from the server computer 12(S) which contains a conditional URL, it will determine from the selection criteria in the Web page and the personal information which of the URL's is to be used with the Web page, and will use that URL to obtain the information to be used as content for the Web page 23(p). A Web page 23(p) may comprise a number of sets of conditional content items and/or URL's, which are associated with diverse portions of the Web page 23(p), and the client computer 11(c) will perform these operations in connection with each set of conditional content items and/or URL's, thereby to select or obtain the content to be associated with each of the portions. In any case, it will be appreciated that, since the selection of the particular conditional content item or URL is made by the client computer 11(c) based on the personal information provided thereby, and not by the server computer based on the personal information for the client computer 11(c), whether provided thereto by the client computer or obtained by the server computer from another source, the network 10 allows the personal information for the client computer 11(c) to remain private to the client computer 11(c).

As noted above, the server computer 12(S) also includes a network interface device 15(S). That network interface device 15(S) connects the server computer 12(S) to the communication link 13, thereby to receive requests from the client computers 11(c) to initiate retrievals of Web pages 23(p) and supplemental content items 27(i) from the server computer 12(S). The network interface device 15(S) will provide such requests to the control module 22, which, in turn, will retrieve the requested Web page(s) 23(p) or supplemental content item(s) 27(i) from the respective Web page store 20 or supplemental content store 21 and provide them to the network interface device 15(s) for transmission to the requesting client computer 11(c). As is conventional, the retrieval requests that the server computer 12(S) receives over the communication link 13 from the respective client computers will be in the form of one or more message packets, and the server computer 12(S) will transmit Web pages 23(p) and supplemental content items 27(i) to the respective client computers over the communication link 13 also in the form of one or more message packets.

FIG. 1 also depicts a functional block diagram of client computer 11(C). The other client computers 11(1) through 11(C-1) may be structured similarly. As shown in FIG. 1, the client computer includes the aforementioned network interface device 14(C), a browser 30, a conditional item selection processor 31, a personal information store 32 and a control module 33. The personal information store will generally be associated with, for example, the aforementioned mass storage subsystems maintained by the client computer 11(C), the control module 33 and conditional item selection processor 31 will generally be associated with the aforementioned processing element along with suitable programming, and the browser 30 will also generally be associated with the processing element along with suitable programming, and farther with the client computer's video display device for providing display to an operator and operator input devices for receiving operator input for controlling the operation of the browser 30.

Generally, the operator of the client computer 11(c), through the browser 30, initiates the retrieval of Web pages from the respective server computers 12(s). After retrieval, the client computer uses the browser 30 to display the respective Web pages to the operator. The operator, generally by means of the client computer's operator input devices, will provide to the browser 30 a URL identifying the Web page to be retrieved by the client computer 11(c). The browser 30 and control module will, in turn, cooperate to generate a retrieval request, which will be transmitted in one or more message packets by the network interface device 14(C) over the communication link 13. The network interface device 14(C) also receives message packets from the communication link 13, content of which will be provided to the control module 33. If the message packets contain Web pages 23(p) requested by the browser 30, the Web pages 23(p) will be provided to the browser 30. The browser 30, in turn, will process the Web pages 23(p) for display to the operator.

In addition, if a Web page 23(p) contains one or more supplemental content URL's 25(1), the browser 30 will cooperate with the control module 33 to generate respective retrieval requests therefor, which will be provided to the network interface device 14(C) for transmission in respective message packets over the communication link 13. The network interface device 14(C) will provide the supplemental content items contained in message packets provided in response to such retrieval requests to the control module 33, which, in turn, will provide the supplemental content items to the browser 30. The browser 30 will, in turn, use the supplemental content items in the respective Web pages 23(p) displayed to the operator.

Further in accordance with the invention, if a Web page 23(p) contains one or more conditional items 26(1), the browser 30 will provide them to the conditional item selection processor 31, either directly or indirectly through the control module 33, for processing in connection with personal information for the client computer 11(c) and/or operator which is stored in the personal information store 32. The conditional item selection processor 31 will use selection criteria and the information in the personal information store to identify, for each set of conditional items, one conditional item to be used in connection with processing and display of the particular Web page 23(p) which contained the conditional items 26(1). If, for a particular conditional item set, the conditional item selection processor 31 selects a content item, it can enable the browser to display the selected content item.

On the other hand, if the conditional item selection processor 31 selects, for example, a URL identifying content, such as a supplemental content item 27(i), retrievable over the communication link 13, it (that is, the conditional item selection processor 31) will enable the browser 30 to cooperate with the control module 33 to generate respective retrieval requests for the URL, which will be provided to the network interface device 14(C) for transmission in respective message packets over the communication link 13. The network interface device 14(C) will provide the supplemental content items contained in message packets provided in response to such retrieval requests to the control module 33, which, in turn, will provide the supplement content item(s) to the browser 30. The browser 30, in turn, will use the supplemental content items in the Web page 23(p) displayed to the operator.

A specific example will help illustrate the operations performed by the client computers 11(c) and server computers 12(s) in connection with the invention. In that example, it will be assumed that Web pages 23(p) are in the form of HTML (HyperText Markup Language) files. In addition, it will be assumed that conditional items 26(1) are in the form of URL's, and that the URL's identify supplemental content items which are in the form of advertisements for personal computer-related products, such as processor, memory, disk, tape or CD-ROM drive devices or the like which an operator may wish to use in upgrading or otherwise modifying his or her client computer 11(c) or another computer to which he or she may have access. It will be appreciated that the network 10 may provide advertising for other types of products in a similar manner. It will further be assumed that the browser 30 is in the form of the Netscape Navigator browser, that the conditional URL's in the Web page are in the form of function calls in the JavaScript Version 1.1 programming language, and that the conditional item selection processor 31 is in the form of a plug-in for the Netscape Navigator browser that can process function calls in the JavaScript Version 1.1 programming language.

In that case, the Web page will contain, in a position in the page before the first conditional URL an HTML "EMBED" tag which starts running and provides a reference name for the plug-in that will be used in subsequent conditional URL's. Such an EMBED tag in the JavaScript Version 1.1 programming language may have the form of, for example:

<EMBED type="application/vnd.belarc-cf" name="batman" HIDDEN>

In this EMBED tag, the term "type="application/vnd.belarc-cf"" identifies the particular program to be processed by the client computer as the plug-in, by naming the content type ("application/vnd.belarc-cf"), also known as a MIME type, associated with that plug-in, and the term "name="batman"" identifies the reference name "batman" to be used in the conditional URL's to identify the program that is to be processed by the client computer as the plug-in. With reference to FIG. 1, the conditional item selection processor 31 includes programming referred to here as the handler for the MIME type "application/vnd.belarc-cf"

After the EMBED tag in the Web page, a set of conditional items may be provided at a location in the Web page at which an advertisement is to appear. One such set of conditional items, in the JavaScript Version 1.1 programming language, may have the form of, for example:

<SCRIPT language=JavaScript>
document.batman.bIf("CDSPEED<4","<IMG SRC= \"CDrom4xAd.gif\">")
document.batman.BElif("CPUCLOCK<100","<IMG SRC="CpuUpgradeAd.gif\">")
document.batman.BElse("<IMG SRC= \"DefaultAd.gif">")
document.write(document.batman.bURL())
</SCRIPT>

In this set of conditional items:

(i) the first line identifies, to the browser, the language of the set of conditional items as being in the JavaScript programming language;

(ii) each of the second through fourth lines comprises a conditional item for which:

(a) "batman" refers to the previously-defined plug-in reference name identifier, to indicate that the plug-in instance with that name is to process the conditional URL;

(b) in the second and third items, parameters "CDSPEED<4" and "CPUCLOCK<100" comprise the selection criteria for the respective items; the selection criteria are defined by relational expressions with "<" comprising one of a plurality of relational operators (other relational expressions will be as described below); parameter "CDSPEED<4" evaluates to "true" if the client computer's CD-ROM drive has a speed of less than "4X," where "X" is a predetermined reference speed, and parameter "CPUCLOCK<100" evaluates to "true" if the client computer's processor clock frequency is less than 100MHz, and otherwise each will evaluate to "false;"

(c) in each of the items, the "<IMG SRC="xxxxx.gif">" (where "xxxx" corresponds to "CDrom4xAd" in the second line, and respective values for the other lines) identifies content, in this case a particular image source file, which is to be used if the item is selected; the content is identified by a conventional HTML tag (other types of content will be described below); and (d) "bIf", "BElif" and "BElse" define conditional functions as follows:

(I) for "bIf," if the first parameter evaluates to "true" (which will be the case if the client computer's CD-ROM drive has a speed of less than "4X"), then the conditional function evaluates to "true" and the second parameter (in this case "<IMG SRC= CDrom4xAd.gif">) is saved by the plug-in as the result;

(II) for "BElif," if the first conditional parameter evaluates to "true" (which will be the case if the client computer's processor clock has a frequency of less than 100 MHz, and the first parameter for none of the preceding conditional functions in the conditional URL evaluated to true, then the "BElif" conditional function evaluates to "true" and the second parameter (in this case "<IMG SRC= \"CDrom4xAd.gif\">) is saved by the plug-in as the result; and (III) for "BElse," if no preceding conditional function of the conditional URL evaluated to true, then second parameter (in this case "<IMG SRC= \"DefaultAd.gif\">) is saved by the plug-in as the result;

(iii) in the fifth line (a) "document.batman.bURL()" returns the result saved during processing of the second through fourth lines as a text string; and (b) "document.write" is a JavaScript function that writes the returned result text string into the Web page, in HTML form, in place of the conditional item; and (iv) the last (sixth) line indicates the end of the conditional item.

When the browser 30 receives the above-described conditional item, it will pass it to the conditional item selection processor 31. The conditional item selection processor 31 will process the second line document.batman.bIf("CDSPEED<4","<IMG SRC=\"CDrom4xAd.gif\">")

which corresponds to the first conditional item of the conditional item set as described above. If the conditional item selection processor 31 determines that the parameter "CDSPEED<4" evaluates to "true," which will be the case if the speed of the client computer's CD-ROM drive is less than "4X," then it will save the value of the second parameter "<IMG SRC=\"CDrom4xAd.gif\">" and, after processing the third and fourth lines without saving their parameters, process the fifth line document.write(document.batman.bURL())

of the conditional item set to re-write the Web page, in particular to insert the saved parameter as HTML in the Web page. The browser 30 will thereafter identify in that HTML the URL to obtain the supplemental content item, in this case an image file "CDrom4xAd.gif" in the "GIF" ("Graphical Interchange Format") format containing an advertisement for display at the corresponding location of the Web page.

On the other hand, if the conditional item selection processor 31 determines that the parameter "CDSPEED<4" in the second line evaluates to "false," which will be the case if the speed of the client computer's CD-ROM drive is not less than "4X," then it will proceed to process the third line document.batman.BElif("CPUCLOCK<100", "<IMG SRC=\"CpuUpgradeAd.gif\">")

which corresponds to the second conditional item of the conditional item set. If the conditional item selection processor 31 determines that the parameter "CPU-CLOCK<100" evaluates to "true," which will be the case if the client computer's processor clock frequency is less than 100MHz, then it will save the value of the second parameter "<IMG SRC="CpuUpgradeAd.gif">" and, after processing the fourth line without saving its parameter, process the fiftl line document.write(document.batman.bURL())

of the conditional item set to re-write the Web page, in particular to insert the saved parameter as HTML in the Web page. The browser 30 will thereafter identify in that HTML the URL to obtain the supplemental content item, in this case an image file "CpuUpgradeAd.gif" containing an advertisement for display at the corresponding location of the Web page.

Finally, if the conditional item selection processor 31 determines that the parameter "CPUCLOCK<100" in the third line evaluates to false, which will be the case if the client computer's processor clock frequency is not less than 100MHz, then it will proceed to process the fourth line document.batman.BElse("<IMG SRC=\"DefaulAd.gif/544 ">")

which corresponds to the last conditional item of the of the conditional item set. In that case, the conditional item selection processor 31 will save the value of the third parameter "<IMG SRC="DefaultAd.gif,">" and process the fifth line document.write(document.batman.bURL0)

of the conditional item set to re-write the Web page, in particular to insert the saved parameter as HTML in the Web page. The browser 30 will thereafter identify in that HTML the URL to obtain the supplemental content item, in this case an image file "DefaultAd.gif" containing a default advertisement for display at the corresponding location of the Web page if none of the advertisements referenced through the preceding lines are used.

It will be appreciated that the information used by the conditional item selection processor in processing the respective lines of the conditional URL, as described above, are maintained by or otherwise obtainable from the client computer and that it (that is, the client computer) itself processes the various lines of the conditional URL. Thus, the information, corresponding to the personal information described above, need not be provided to the server computer or another third party to determine the appropriate advertisement image to be displayed by the browser 30.

In the above illustrative conditional item, the first parameter of each of lines two and three (that is, "CDSPEED<4" in line two and "CPUCLOCK<100" in line three) is an expression understood by the conditional item selection processor 31. An expression has one of the following forms:

expression: keyName relop constant keyName !keyName where relop ("relationship operator") is one of "<" (less than), ">" (greater than), "<=" (less than or equal to), ">=" (greater than or equal to", "==" (equal to), or "!=" (not equal to). In processing an expression, the conditional item processor 31 will replace the "keyName" for each expression with the client computer-specific value for the item that it identifies before processing the expression to determine whether it evaluates to true or false, according to the rules of the C programming language. Thus, an expression having the form "keyName relop constant" evaluates to true if the variable "keyName" (such as, for the above-described illustrative conditional URL, "CDSPEED" in the first parameter in line two and "CPUCLOCK" in the first parameter of line three) has the appropriate relation, as defined by the relationship operator ("less than" for both lines two and three) to a constant value (such as, for the above-described illustrative conditional URL, "4" in the first parameter of line two and "100" in the first parameter of line 3). Otherwise, an expression having such a form will evaluate to false.

Similarly, an expression of the form "keyName" will evaluate to true if the variable represented by "keyName" is true, and "!keyName" will evaluate to true if the variable represented by "keyName" is false. Thus, if, for example, a conditional URL has an expression "1486", the expression evaluates to true if the client computer has a processor whose architecture conforms to the Intel 80486 architecture, and to false if the client computer does not have a processor whose architecture conforms to the Intel 80486 architecture. Conversely, if a conditional URL has an expression "!SCSI", where "SCSI" refers to an interface that conforms to the SCSI ("small computer systems interface") specification, the expression will evaluate to true if the client computer does not have a SCSI interface, and to false if the client computer does have a SCSI interface.

Other forms of expressions, will be apparent to those skilled in the art, as will other keyName variable names, relational operators and corresponding constant values.

In the illustrative conditional item set described above, the conditional items are all in the form of conditional content UTRL's. As noted above, the conditional items can include any of a number of other types items, including, for example, content, applet code, HyperText links and other types of objects.

Figure 2:
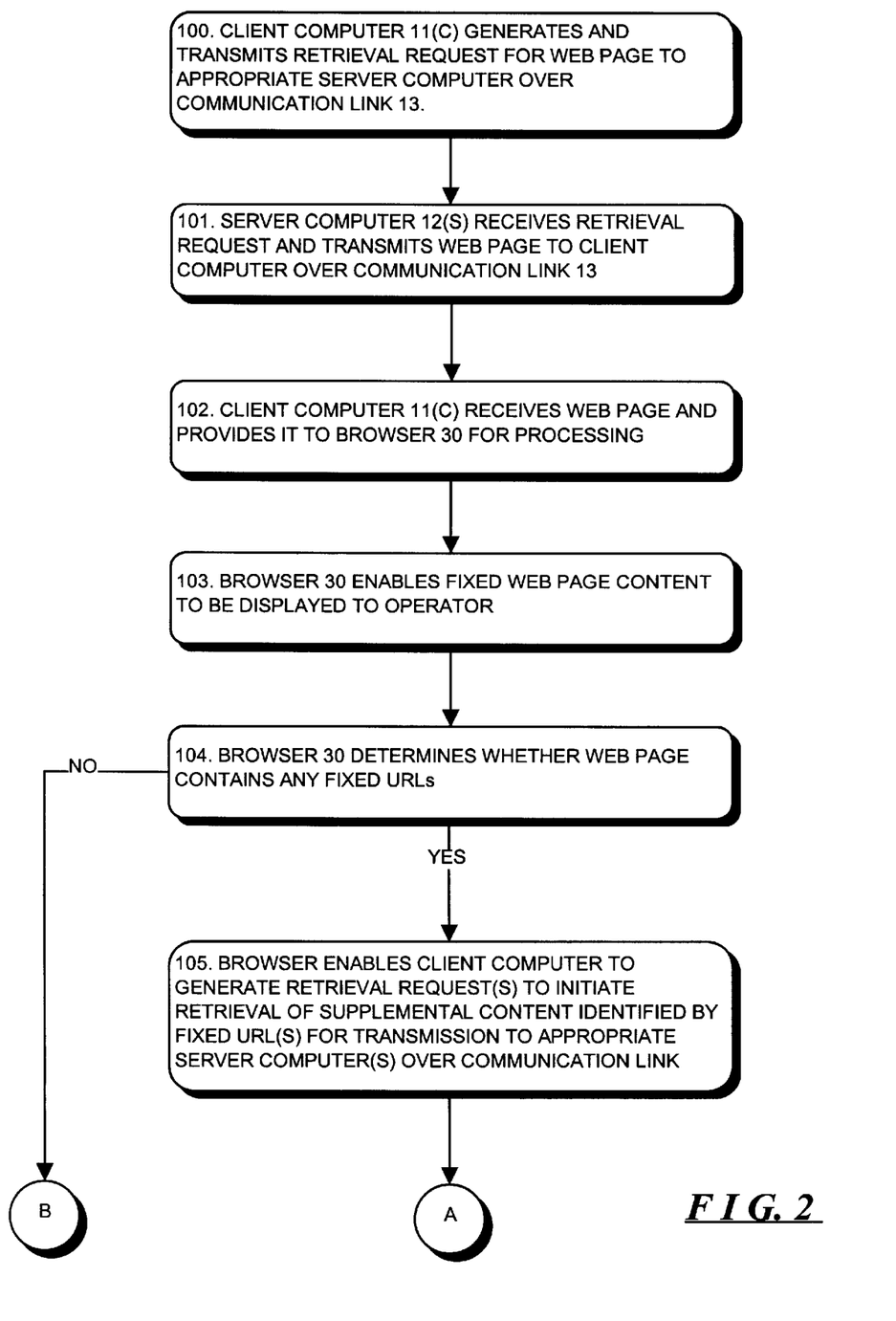
FIGS. 2, 2A and 2B are flowcharts depicting operations performed by the server computers and client computers depicted in FIG. I in connection with the invention.
Figure 2A:
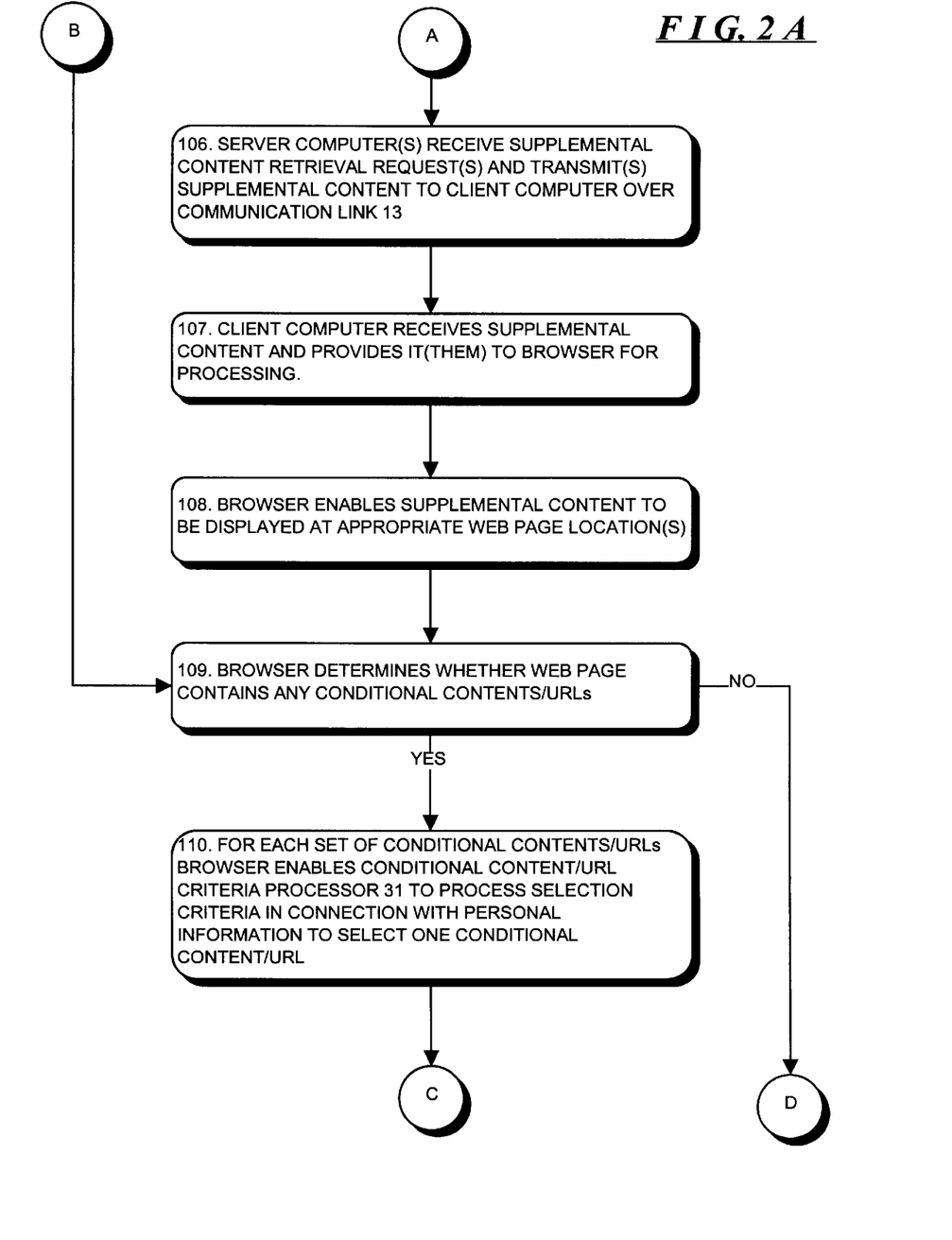
Figure 2B:
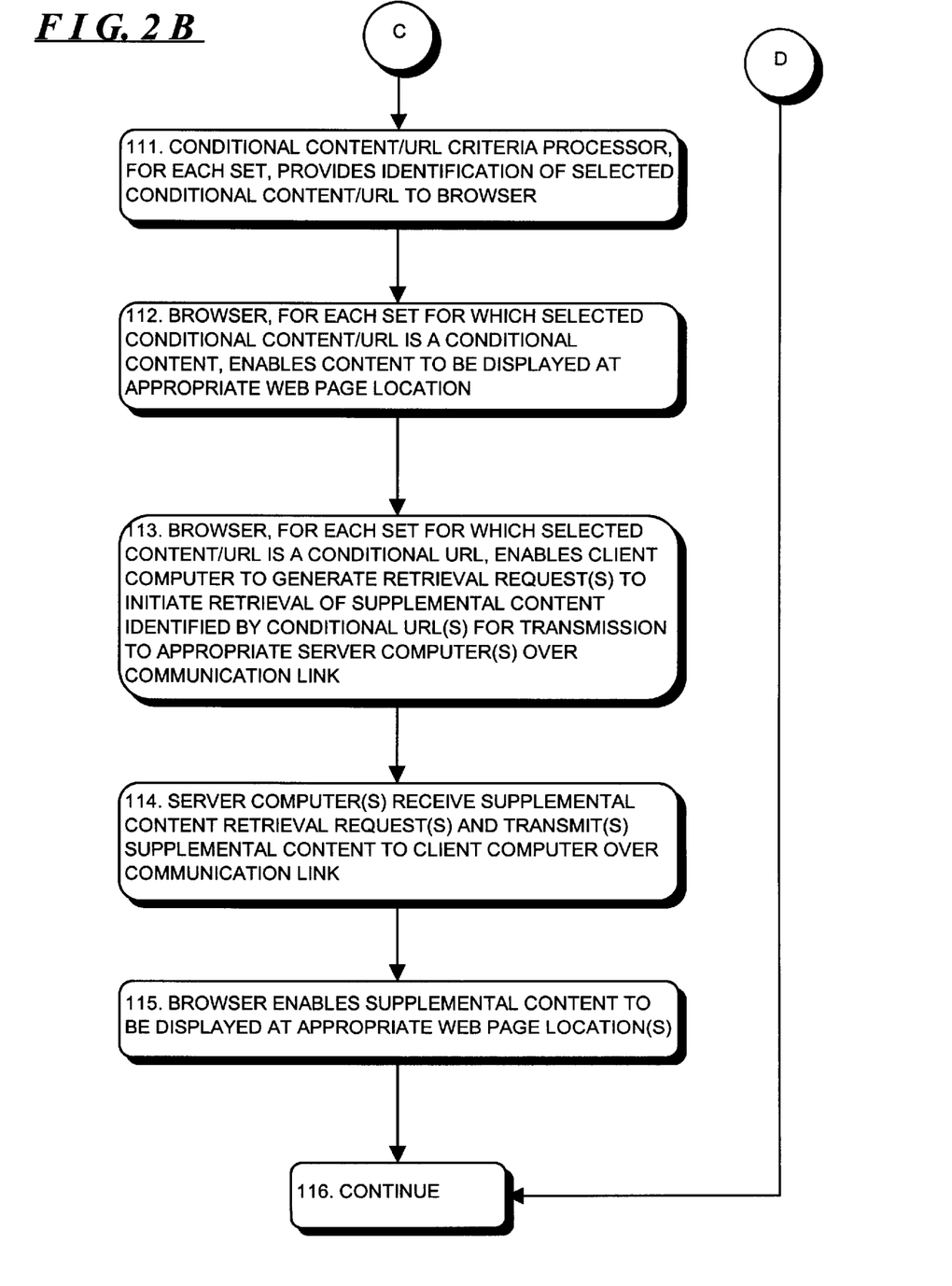

FIG. 2 contains a flowchart depicting operations performed by the client computer(s) 11(c) and server computer(s) 11(s) in connection with retrieval of Web pages and processing of conditional items to obtain supplemental content items for use in conjunction with the retrieved Web pages. The operations depicted in FIG. 2 will be apparent to those skilled in the art from the above description and will not be described further herein.

The invention provides a number of advantages. In particular, the invention facilitates the personalization and targeting of "supplemental content item" content, such as advertisements and the like, for use in connection with Web pages, all of which are retrieved by client computers over a network, with the personalization and targeting being based on personal information which is maintained by the client computer itself, and which is not provided to or otherwise obtained by server computers or other parties which provide the Web pages and other supplemental content item content. Thus, the invention provides for the maintenance of the privacy of the information used to personalize and target the supplemental content item content. In addition, the invention provides for the more accurate personalization and targeting of the supplemental content item content, since it will be based on the actual information as maintained by the client computer, instead of on potentially incomplete or inaccurate information which may have been accumulated by the providers of the supplemental content item content.

It will be appreciated that numerous variations and modifications may be made to the server computers and client computers described above in connection with FIGS. 1 and 2. For example, the invention can be used in connection with numerous types of networks, including but not limited to the Internet and World Wide Web, and may make use of many types of message formats and communication links. In addition, although the invention has been described in connection with the use of Netscape's Navigator browser it will be appreciated that numerous browsers can be used. Similarly, although the invention has been described in connection with use of a plug-in as the conditional item selection processor, with the plug-in processing conditional content and URL's passed to it by the JavaScript programming language, it will be appreciated that various types of interconnection mechanisms may be used to facilitate communications between the browser 30 and the conditional item selection processor 31 and that the conditional content and URL's may be defined using numerous types of programming languages.

In addition, although the invention has been described as providing a conditional item selection processor 31 that effectively re-writes the Web page using an item selected from each conditional item set, a variety of other arrangements maybe used. For example, instead of re-writing the Web page and having the browser display a selected content item or initiate retrieval of a supplemental content item, the conditional item selection processor 31, after receiving a conditional item set, can enable the browser 30 to provide it (that is, the conditional item selection processor 31) with a window. The conditional item selection processor 31 will then select the appropriate conditional item as described above. However, instead of re-writing the Web page, the conditional item selection processor 31 will, if the selected item is a content item, itself display the content in the window. On the other hand, if the selected item is a URL or other identifier of a supplemental content item retrievable over the communication link 13, the conditional item selection processor will initiate a retrieval of the supplemental content item and, when it (that is, the supplemental content item) is received, display the supplemental content item in the window.

Furthermore, although the invention has been described in connection with customization and personalization of Web pages in the HTML language, it will be appreciated that the invention can be used in connection with customization and personalization of information that is downloadable over a network, including but not limited to the Internet, using any information transfer protocol and methodology. The information may comprise data for use in connection with the client computer, such as for display to an operator, or it may be used as program code for execution by the computer, or any combination thereof. In addition, the browser may comprise any component that can be used in connection with a client computer to initiate a retrieval of downloadable information over the network.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A network including a server computer and a client computer,
   A. the server computer having a downloadable information item having associated therewith a conditional item set comprising a plurality of conditional content items, each conditional content item being associated with information content used in connection with said downloadable information item, and each conditional content item further being associated with a personal selection criterion,
   B. said client computer having
      i. a browser configured to initiate the retrieval of downloadable information item from said server computer, and
      ii. a conditional item selection processor configured to process the personal selection criteria associated with said conditional content items in relation to personal information associated with and maintained by said client computer to select one of said conditional content items for use in connection with said downloadable information item.

2. A network as defined in claim 1 in which the selected conditional content item comprises a pointer to content that is retrievable over the network, the client computer being configured to use the pointer to retrieve the content over the network.

3. A network as defined in claim 2 in which the conditional item selection processor is configured to select one of said conditional content items by modifying the downloadable information item, thereby to enable the browser to initiate a retrieval of content pointed to by the pointer and display the content associated therewith to the operator.

4. A network as defined in claim 3 in which the conditional item selection processor is configured to modify the downloadable information item by deleting the conditional content item set and inserting therefor the selected conditional content item.

5. A network as defined in claim 4 in which the downloadable information item as received by said browser is in textual form, the conditional item selection processor being configured to re-write the text of the downloadable information item by deleting the conditional content item set and inserting therefor the selected conditional content item.

6. A network as defined in claim 2 in which the conditional item selection processor is configured to enable the display to display the content to the operator.

7. A network as defined in claim 2 in which the conditional item selection processor is configured to enable the browser to, in turn, enable the display to display the content to the operator.

8. A network as defined in claim 1 in which the client computer includes a display configured to display information to the operator, the conditional content item as selected by the conditional item selection processor being used in connection with display of said retrieved downloadable information item to the operator.

9. A network as defined in claim 8 in which the selected conditional content item comprises content configured to be displayed to the operator.

10. A network as defined in claim 9 in which the conditional item selection processor is configured to enable the display to display the content to the operator.

11. A network as defined in claim 9 in which the conditional item selection processor is configured to enable the browser to, in turn, enable the display to display the content to the operator.

12. A network as defined in claim 1 the conditional item selection processor is configured to select one of said conditional content items by modifying the downloadable information item.

13. A network as defined in claim 12 in which the conditional item selection processor is configured to modify the downloadable information item by deleting the conditional content item set and inserting therefor the selected conditional content item.

14. A network as defined in claim 12 in which the downloadable information item as received by said browser is in textual form, the conditional item selection processor being configured to re-write the text of the downloadable information item by deleting the conditional content item set and inserting therefor the selected conditional content item.

15. A network as defined in claim 1 in which the downloadable information item is a Web page.

16. A network as defined in claim 1 in which the downloadable information item further includes at least one fixed content item, the browser being configured to use said at least one fixed content item in connection with said retrieved downloadable information item.

17. A client computer configured to be used in a network including a server computer, the server computer having a downloadable information item associated with a conditional item set comprising a plurality of conditional content items, each conditional content item being associated with content to be displayed at a selected location in the downloadable information item, and each conditional content item further being associated with a personal selection criterion, said client computer comprising:
 A. a browser configured to initiate the retrieval of said downloadable information item from said server computer; and
 B. a conditional item selection processor configured to process the personal selection criteria associated with said conditional content items in relation to personal information associated with and maintained by said client computer to select one of said conditional content items for use in connection with said downloadable information item.

18. A client computer as defined in claim 17 in which the selected conditional content item comprises a pointer to content that is retrievable over the network, the client computer being configured to use the pointer to retrieve the content over the network.

19. A client computer as defined in claim 18 in which the conditional item selection processor is configured to select one of said conditional content items by modifying the downloadable information item, thereby to enable the browser to initiate a retrieval of content pointed to by the pointer and display the content associated therewith to the operator.

20. A client computer as defined in claim 19 in which the conditional item selection processor is configured to modify the by deleting the conditional content item set and inserting therefor the selected conditional content item.

21. A client computer as defined in claim 20 in which the downloadable information item as received by said browser is in textual form, the conditional item selection processor being configured to rewrite the text of the downloadable information item by deleting the conditional content item set and inserting therefor the selected conditional content item.

22. A client computer as defined in claim 18 in which the conditional item selection processor is configured to enable the display to display the content to the operator.

23. A client computer as defined in claim 18 in which the conditional item selection processor is configured to enable the browser to, in turn, enable the display to display the content to the operator.

24. A client computer as defined in claim 17 in which the client computer includes a display configured to display information to the operator, the conditional content item as selected by the conditional item selection processor being used in connection with display of said retrieved downloadable information item to the operator.

25. A client computer as defined in claim 24 in which the selected conditional content item comprises content configured to be displayed to the operator.

26. A client computer as defined in claim 25 in which the conditional item selection processor is configured to enable the display to display the content to the operator.

27. A client computer as defined in claim 25 in which the conditional item selection processor is configured to enable the browser to, in turn, enable the display to display the content to the operator.

28. A client computer as defined in claim 17 the conditional item selection processor is configured to select one of said conditional content items by modifying the downloadable information item.

29. A client computer as defined in claim 28 in which the conditional item selection processor is configured to modify the downloadable information item by deleting the conditional content item set and inserting therefor the selected conditional content item.

30. A client computer as defined in claim 28 in which the downloadable information item as received by said browser is in textual form, the conditional item selection processor being configured to re-write the text of the downloadable information item by deleting the conditional content item set and inserting therefor the selected conditional content item.

31. A client computer as defined in claim 17 in which the downloadable information item is a Web page.

32. A client computer as defined in claim 17 in which the downloadable information item further includes at least one fixed content item, the browser being configured to use said at least one fixed content item in connection with said retrieved downloadable information item.

33. A conditional item selection processing arrangement configured to be used in connection with a client computer, the client computer configured to be used in a network including a server computer, the server computer having a downloadable information item associated with a conditional item set comprising a plurality of conditional content items, each conditional content item being associated with content to be used in connection with the downloadable information item, and each conditional content item further being associated with a personal selection criterion, said client computer further including a browser configured to initiate the retrieval of said downloadable information item from said server computer, the conditional item selection processing arrangement including:
 A. a conditional item set receiver configured to receive the conditional item set from said browser, and
 B. a conditional item selection processor configured to process the personal selection criteria associated with the conditional content items comprising the conditional item set as received by the conditional item set receiver in relation to personal information associated with and maintained by said client computer to select one of said conditional content items for use in connection with said downloadable information item.

34. A conditional item selection processing arrangement as defined in claim 33 in which the selected conditional content item comprises a pointer to content that is retrievable over the network, the client computer being configured to use the pointer to retrieve the content over the network.

35. A conditional item selection processing arrangement as defined in claim 34 in which the conditional item selection processor is configured to select one of said conditional content items by modifying the downloadable information item, thereby to enable the browser to initiate a retrieval of content pointed to by the pointer and display the content associated therewith to the operator.

36. A conditional item selection processing arrangement as defined in claim 35 in which the conditional item selection processor is configured to modify the downloadable information item by deleting the conditional content item set and inserting therefor the selected conditional content item.

37. A conditional item selection processing arrangement as defined in claim 36 in which the downloadable information item as received by said browser is in textual form, the conditional item selection processor being configured to re-write the text of the downloadable information item by deleting the conditional content item set and inserting therefor the selected conditional content item.

38. A conditional item selection processing arrangement as defined in claim 34 in which the conditional item selection processor is configured to enable the display to display the content to the operator.

39. A conditional item selection processing arrangement as defined in claim 34 in which the conditional item selection processor is configured to enable the browser to, in turn, enable the display to display the content to the operator.

40. A conditional item selection processing arrangement as defined in claim 33 in which the client computer includes a display configured to display information to the operator, the conditional content item as selected by the conditional item selection processor being used in connection with display of said retrieved downloadable information item to the operator.

41. A conditional item selection processing arrangement as defined in claim 40 in which the selected conditional content item comprises content configured to be displayed to the operator.

42. A conditional item selection processing arrangement as defined in claim 41 in which the conditional item selection processor is configured to enable the display to display the content to the operator.

43. A conditional item selection processing arrangement as defined in claim 41 in which the conditional item selection processor is configured to enable the browser to, in turn, enable the display to display the content to the operator.

44. A conditional item selection processing arrangement as defined in claim 33 the conditional item selection processor is configured to select one of said conditional content items by modifying the downloadable information item.

45. A conditional item selection processing arrangement as defined in claim 44 in which the conditional item selection processor is configured to modify the downloadable information item by deleting the conditional content item set and inserting therefor the selected conditional content item.

46. A conditional item selection processing arrangement as defined in claim 44 in which the downloadable information item as received by said browser is in textual form, the conditional item selection processor being configured to re-write the text of the downloadable information item by deleting the conditional content item set and inserting therefor the selected conditional content item.

47. A conditional item selection processing arrangement as defined in claim 33 in which the downloadable information item is a Web page.

48. A conditional item selection processing arrangement as defined in claim 33 in which the downloadable information item further includes at least one fixed content item, the browser being configured to use said at least one fixed content item in connection with said retrieved downloadable information item.

49. A conditional item selection processing method for use in connection with a client computer, the client computer configured to be used in a network including a server computer, the server computer having a downloadable information item associated with a conditional item set comprising a plurality of conditional content items, each conditional content item being associated with content to be used in connection with the downloadable information item, and each conditional content item further being associated with a personal selection criterion, said client computer further including a browser configured to initiate the retrieval of said downloadable information item from said server computer, the conditional item selection processing method including:

A. a conditional item set receiving step including the step of receiving the conditional item set from said browser, and B. a conditional item selection processing step including the step of processing the personal selection criteria associated with the conditional content items comprising the conditional item set as received by the conditional item set receiver in relation to personal information associated with and maintained by said client computer to select one of said conditional content items for use in connection with downloadable information item.

50. A conditional item selection processing method as defined in claim 49 in which the selected conditional content item comprises a pointer to content that is retrievable over the network, method further comprising the step of enabling the client computer to use the pointer to retrieve the content over the network.

51. A conditional item selection processing method as defined in claim 50 in which the conditional item selection processing step includes the step of selecting one of said conditional content items by modifying the downloadable information item, thereby to enable the browser to initiate a retrieval of content pointed to by the pointer and display the content associated therewith to the operator.

52. A conditional item selection processing method as defined in claim 51 in which the conditional item selection processing step includes the step of modifying the downloadable information item by deleting the conditional content item set and inserting therefor the selected conditional content item.

53. A conditional item selection processing method as defined in claim 52 in which the downloadable information item as received by said browser is in textual form, the conditional item selection processing step including the step of re-writing the text of the downloadable information item by deleting the conditional content item set and inserting therefor the selected conditional content item.

54. A conditional item selection processing method as defined in claim 50 in which the client computer includes a display, the conditional item selection processing step including the step of enabling the display to display the content to the operator.

55. A conditional item selection processing method as defined in claim 50 in which the conditional item selection processing step includes the step of enabling the browser to, in turn, enable the display to display the content to the operator.

56. A conditional item selection processing method as defined in claim 49 in which the client computer includes a display configured to display information to the operator, the conditional content item as selected by the conditional item selection processing step including the step of enabling the display to display said retrieved downloadable information item to the operator.

57. A conditional item selection processing method as defined in claim 56 in which the selected conditional content item comprises content configured to be displayed to the operator.

58. A conditional item selection processing method as defined in claim 57 in which the conditional item selection processing step is includes the step of enabling the display to display the content to the operator.

59. A conditional item selection processing method as defined in claim 57 in which the conditional item selection processing step includes the step of enabling the browser to, in turn, enable the display to display the content to the operator.

60. A conditional item selection processing method as defined in claim 49 the conditional item selection processing step includes the step of selecting one of said conditional content items by modifying the downloadable information item.

61. A conditional item selection processing method as defined in claim 60 in which the conditional item selection processing step includes the step of modifying the downloadable information item by deleting the conditional content item set and inserting therefor the selected conditional content item.

62. A conditional item selection processing method as defined in claim 60 in which the downloadable information item as received by said browser is in textual form, the conditional item selection processing step including the step of re-writing the text of the downloadable information item by deleting the conditional content item set and inserting therefor the selected conditional content item.

63. A conditional item selection processing method as defined in claim 49 in which the downloadable information item is a Web page.

64. A conditional item selection processing method as defined in claim 49 in which the downloadable information item further includes at least one fixed content item, the method further comprising the step of enabling the browser to use said at least one fixed content item in connection with said retrieved downloadable information item.

65. A computer program product configured to be used in connection with a client computer, the client computer configured to be used in a network including a server computer, the server computer having a downloadable information item associated with a conditional item set comprising a plurality of conditional content items, each conditional content item being associated with content to be displayed at a selected location in the downloadable information item, and each conditional content item further being associated with a personal selection criterion, said client computer further including a browser configured to initiate the retrieval of said downloadable information item from said server computer, the computer program product comprising a computer-readable medium having encoded thereon a conditional item selection processor module configured to enable the client computer to process the personal selection criteria associated with the conditional content items comprising the conditional item set in relation to personal information associated with and maintained by said client computer to select one of said conditional content items for use in connection with aid downloadable information item.

66. A computer program product as defined in claim 65 in which the selected conditional content item comprises a pointer to content that is retrievable over the network, the client computer being configured to use the pointer to retrieve the content over the network.

67. A computer program product as defined in claim 66 in which the conditional item selection processor module is configured to enable the computer to select one of said conditional content items by modifying the downloadable information item, thereby to enable the browser to initiate a retrieval of content pointed to by the pointer and display the content associated therewith to the operator.

68. A computer program product as defined in claim 67 in which the conditional item selection processor module is configured to enable the computer to modify the downloadable information item by deleting the conditional content item set and inserting therefor the selected conditional content item.

69. A computer program product as defined in claim 68 in which the downloadable information item as received by said browser is in textual form, the conditional item selection processor module being configured to enable the computer to re-write the text of the downloadable information item by deleting the conditional content item set and inserting therefor the selected conditional content item.

70. A computer program product as defined in claim 66 in which the conditional item selection processor module is configured to enable the computer to display to display the content to the operator.

71. A computer program product as defined in claim 66 in which the conditional item selection processor module is configured to enable the computer to, in turn, enable the browser to enable the display to display the content to the operator.

72. A computer program product as defined in claim 65 in which the client computer includes a display configured to display information to the operator, the selected conditional content item being used in connection with display of said retrieved downloadable information item to the operator.

73. A computer program product as defined in claim 72 in which the selected conditional content item comprises content configured to be displayed to the operator.

74. A computer program product as defined in claim 73 in which the conditional item selection processor module is configured to enable the computer to, in turn, enable the display to display the content to the operator.

75. A computer program product as defined in claim 73 in which the conditional item selection processor module is configured to enable the computer to, in turn, enable the browser to enable the display to display the content to the operator.

76. A computer program product as defined in claim 65 the conditional item selection processor module is configured to enable the computer to select one of said conditional content items by modifying the downloadable information item.

77. A computer program product as defined in claim 76 in which the conditional item selection processor module is configured to enable the computer to modify the downloadable information item by deleting the conditional content item set and inserting therefor the selected conditional content item.

78. A computer program product as defined in claim 76 in which the downloadable information item as received by said browser is in textual form, the conditional item selection processor module being configured to enable the computer to re-write the text of the downloadable information item by deleting the conditional content item set and inserting therefor the selected conditional content item.

79. A computer program product as defined in claim 65 in which the downloadable information item is a Web page.

80. A computer program product as defined in claim 65 in which the downloadable information item further includes at least one fixed content item, the browser being configured to enable the computer to use said at least one fixed content item in connection with said retrieved downloadable information item.

* * * * *